United States Patent [19]
Hirsch et al.

[11] Patent Number: 5,941,126
[45] Date of Patent: Aug. 24, 1999

[54] SHIFT FORK ASSEMBLY

[75] Inventors: Mark A. Hirsch, Vicksburg; Thomas G. Ore, Kalamazoo, both of Mich.

[73] Assignee: Eaton Corporation, Cleveland, Ohio

[21] Appl. No.: 09/041,150

[22] Filed: Mar. 12, 1998

[51] Int. Cl.⁶ .............................. F16D 23/00; B25G 3/26; B23P 11/00
[52] U.S. Cl. .................................. 74/473.37; 29/525.03; 403/315; 403/324; 403/329; 403/379.2; 411/356
[58] Field of Search ............................ 74/473.36, 473.37; 29/525.03; 403/315, 319, 324, 329, 379.2, 379.5; 411/356, 500, 119, 121

[56] References Cited

U.S. PATENT DOCUMENTS

| | | | |
|---|---|---|---|
| 613,970 | 11/1898 | Christy | 403/324 X |
| 3,169,403 | 2/1965 | McGinn | 403/324 X |
| 3,281,164 | 10/1966 | Reaser | 403/324 X |
| 4,238,012 | 12/1980 | Takiguchi et al. | 74/473.37 X |
| 4,607,977 | 8/1986 | Varnelis et al. | 29/525.03 X |
| 5,487,318 | 1/1996 | Schott | 74/473.37 X |

*Primary Examiner*—Allan D. Herrmann
*Attorney, Agent, or Firm*—Brooks & Kushman P.C.

[57] ABSTRACT

A shift fork assembly includes a pin sized for clearance and a retainer clip to secure a shift fork to a shift rail. The shift rail has a transverse bore extending at least partially into the shift rail. The shift fork has an axial bore receiving the shift rail therethrough, and a transverse mount hole intersecting the axial bore. The pin extends through the mount hole and at least partially into the transverse bore. The pin is sized for clearance relative to the mount hole and the transverse bore to facilitate assembly. The retainer clip is affixed to the shift fork and engages the pin to retain the pin within the transverse bore.

14 Claims, 4 Drawing Sheets

SHIFT FORK ASSEMBLY

TECHNICAL FIELD

The present invention relates to shift fork assemblies for use in vehicular transmissions and transaxles.

BACKGROUND ART

Manual transmissions and transaxles are shifted by shift fork assemblies. A shift fork assembly includes a shift fork that rides in a groove cut into a sliding clutch collar of the transmission or transaxle. One type of shift fork assembly includes a single shift shaft having multiple shift forks positioned thereon. The shift shaft is connected to the shift stick within the vehicle. Lateral or side-to-side movement of the is shift stick adjusts the angular position of the shift shaft. The shift shaft angular position determines which one of the shift forks moves with the shift shaft when the shift stick is moved into gear.

Another type of shift fork assembly includes a shift rail having a fixed shift fork that moves with the shift rail. Movement of the vehicle shift stick allows selection of a particular shift rail from a plurality of different shift rails. The shift fork on the selected shift rail moves with the selected shift rail when the shift stick is moved into gear. Because the shift fork is fixed to the shift rail, this type of shift fork assembly may be shifted remotely, for example, using valves and pistons.

Some transmissions and transaxles utilize both types of shift fork assemblies in the same transmission or transaxle. For example, compound vehicular transmissions have a main section connected in series with an auxiliary section. Typically, the main section is shifted directly with a shift stick connected to a single shift shaft, while the auxiliary section, whether a range section, splitter section, or combined range/splitter section, is shifted remotely using one or more valves and pistons. Thus, the auxiliary section of the transmission, for example, may employ a shift fork assembly of the type in which a shift fork is fixed to a shift rail. An auxiliary section ratio change may be indicated by the position of the shift stick, or may be initiated by a separate switch on the shift stick, such as a hi/lo range switch and/or a hi/lo splitter switch.

While shift fork assemblies of the type in which a shift fork is fixed to a shift rail are suitable for a number of applications which have been commercially successful, assembly of the shift fork to the shift rail is difficult. Typically the shift rail is positioned through an axial bore in the shift fork, and the shift rail and shift fork are placed inside the transmission (or transaxle) housing. Thereafter, a cone point screw is inserted into a shift fork mount hole intersecting the shift fork axial bore. The assembler aligns the shift fork mount hole with a transverse bore that extends partially into the shift rail, and then tightens the cone point screw, typically with a power tool. Due to space constraints when working on a partially assembled transmission (or transaxle), it is very difficult to tighten the cone screw. Further, many times the assembler does not know if the shift rail transverse bore and shift fork mount hole are aligned correctly until an attempt is made to tighten the cone screw. As such, it may take several assembly attempts before the shift fork is properly secured to the shift rail. With each shift fork to shift rail assembly potentially taking several attempts before proper assembly, the cost of manufacturing transmissions is increased.

SUMMARY OF THE INVENTION

It is, therefore, an object of the present invention to provide an improved shift fork assembly and method of assembling a transmission or transaxle that facilitates assembly of a shift fork to the shift rail.

It is another object of the present invention to provide an improved shift fork assembly that may be utilized in a variety of transmissions and transaxles, including utilization in the auxiliary section of a compound transmission for a heavy duty vehicle.

In carrying out the above objects and other objects and features of the present invention, a shift fork assembly is provided. The shift fork assembly comprises a shift rail having a transverse bore extending at least partially into the shift rail. A shift fork has an axial bore receiving the shift rail therethrough, and a transverse mount hole intersecting the axial bore. A pin extends through the mount hole and at least partially into the transverse bore. The pin is sized for clearance relative to the mount hole and the transverse bore to facilitate assembly of the shift fork to the shift rail. A retainer clip affixed to the shift fork engages the pin to retain the pin within the transverse bore.

Preferably, the transverse bore extends completely through the shift rail. First and second mount holes are located opposite each other along a transverse axis of the shift fork. The first and second mount holes both intersect the axial bore. The pin extends along the transverse axis through the first mount hole, the transverse bore, and the second mount hole to secure the shift fork to the shift rail.

Further, in a preferred embodiment, the retainer clip has a first end pivotally attached to the shift fork at a location spaced from the mount hole. A second end of the retainer clip is pivotable toward and away from the mount hole so that the pin may be inserted through the mount hole. The retainer clip second end may be subsequently positioned into engagement with the pin to retain the pin within the transverse bore.

Further, in carrying out the present invention, a shift fork having an axial bore for receiving a shift rail therethrough, and a transverse mount hole intersecting the axial bore is provided. A retainer clip is affixed to the shift fork for retaining a pin extending through the mount hole to assemble the shift fork to a shift rail.

Still further, in carrying out the present invention, a method of assembling a shift fork assembly is provided. The method comprises affixing a retainer clip to a shift fork, positioning a shift rail through an axial bore of the shift fork, aligning a shift fork mount hole with a shift rail transverse bore, and inserting a pin through the mount hole at least partially into the transverse bore. The method further comprises orienting a retainer clip to retain the pin within the transverse bore.

The advantages associated with the present invention are numerous. For example, embodiments of the present invention facilitate assembly of a shift fork to a shift rail during transmission or transaxle assembly. Embodiments of the present invention are particularly advantageous for use in, among other things, the auxiliary section of a compound transmission for a heavy duty vehicle.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1A:
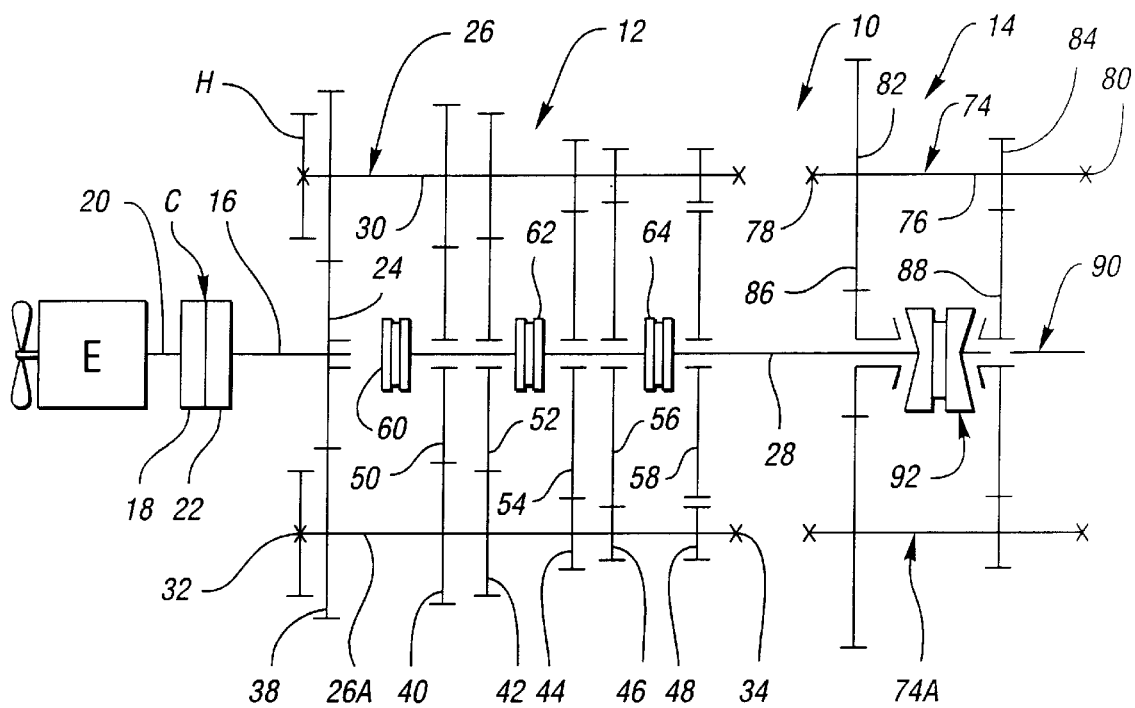
FIG. 1A is a schematic illustration of a compound transmission having a range type auxiliary section utilizing a shift fork assembly of the present invention.

Certain terminology will be used in the following description for convenience in reference only and will not be limiting. The words "upwardly", "downwardly", "rightwardly", and "leftwardly" will designate directions in the drawings to which reference is made. The words "forward" and "rearward", will refer respectively to the front and rear ends of the transmission as conventionally mounted in a vehicle, being respectively from left and right sides of the transmission as illustrated in FIG. 1A. The words "inwardly" and "outwardly" will refer to directions toward and away from, respectively, the geometric center of the device and designated parts thereof. This terminology will include the words above specifically mentioned, derivatives thereof, and words of similar import.

The term "compound transmission" is used to designate a change speed or change gear transmission having a multiple forward speed main transmission section and a multiple speed auxiliary transmission section connected in series where the selected gear reduction in the main transmission section may be compounded by further selected gear reduction in the auxiliary transmission section. Of course, it is to be appreciated that embodiments of the present invention may be employed in a variety of different transmission or transaxle assemblies, and that a compound transmission is illustrated herein for exemplary purposes.

The terms "neutral" and "not engaged" are used interchangeably and refer to a main transmission section condition wherein torque is not transferred from the transmission input shaft to the mainshaft. The terms "not neutral" and "engaged" are used interchangeably and refer to a main transmission section condition where a main section drive ratio is engaged and drive torque is transferred from the transmission input shaft to the main shaft.

The term "high speed" ratio refers to that ratio of a transmission section wherein the rotational speed of the output is greatest for a given input rotational speed.

Figure 1B:
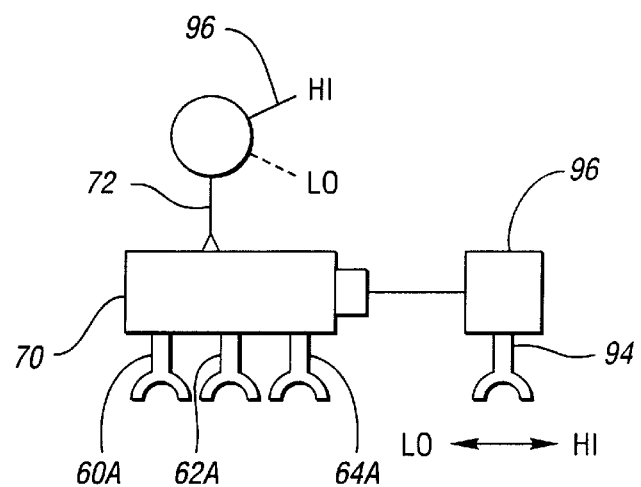
FIG. 1B is a schematic illustration of the shifting mechanisms of the transmission of FIG. 1A.
Figure 1C:
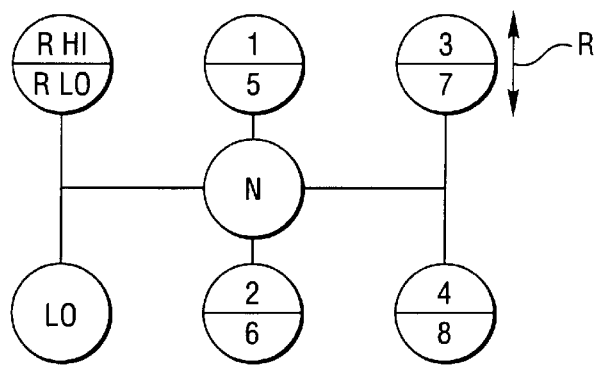
FIG. 1C is a schematic illustration of the "repeat Hi" type shift pattern of the transmission of FIG. 1A.

Referring to FIGS. 1A, 1B, and 1C, a range type compound transmission 10 is illustrated. Compound transmission 10 comprises a multiple speed main transmission section 12 connected in series with a range type auxiliary section 14. Transmission 10 is housed within a housing H and includes an input shaft 16 driven by an engine, such as diesel engine E, through a selectively disengaged, normally engaged master clutch C having an input or driving portion 18 connected to the engine crankshaft 20 and a driven portion 22 rotatably fixed to the transmission input shaft 16.

In main transmission section 12, input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62, and 64. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks 60A, 62A and 64A, respectively, associated with the shift housing assembly 70 Clutch collars 60, 62 and 64 may be of the synchronized or nonsynchronized clutch type.

Mainshaft gear 58 is the reverse gear and is in continuous meshing engagement with countershaft gears 48 by means of conventional intermediate idler gears. While main transmission section 12 does provide five selectable forward speed ratios, the lowest forward speed ratio, namely that provided by drivingly connecting mainshaft drive gear 56 to mainshaft 28, is often of such a high gear reduction that it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" or "(4+1)" main section as only four of the forward speeds are compounded by the auxiliary range transmission section 14.

Clutch collars 60, 62, and 64 are three-position clutches in that they may be positioned in the centered, nonengaged position as illustrated, or in a fully rightwardly engaged or fully leftwardly engaged position by means of a shift stick 72 and cooperating shift fork assemblies. As is well known, only one of the clutch collars 60, 62, and 64 is engageable at a given time as main section interlock means (not shown) are provided to lock the other clutches in the neutral position.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 which is fixed for rotation with mainshaft 28. Auxiliary section countershaft gears 84 are constantly meshed with output gear 88 which surrounds transmission output shaft 90.

A two-position synchronized jaw clutch assembly 92 is axially positioned by means of shift fork 94 and the range section shifting actuator assembly 96. Jaw clutch assembly 92 is provided for clutching either gear 88 to output shaft 90 (for low range operation), or gear 86 to output shaft 90 (for direct or high range operation). The "repeat H" type shift pattern for compound range type transmission 10 is schematically illustrated in FIG. 1C. Selection and/or preselection of low or high range operation of the transmission 10 is accomplished using an operator actuated switch or button 98 which is usually located at the shift stick 72.

Main transmission section 12 is controlled by axial movement of at least one shift rail or shift shaft contained within housing assembly 70 and controlled by operation of shift stick 72. As is known, shift stick 72 may be mounted directly to, or remotely from, the transmission. The range section is controlled by operation of button 98, or a position switch in the case of a "double H" type control. Shift bar housing 70 may be a multiple shift rail arrangement, or a single shift shaft, both of which are well known in the art.

Figure 2:
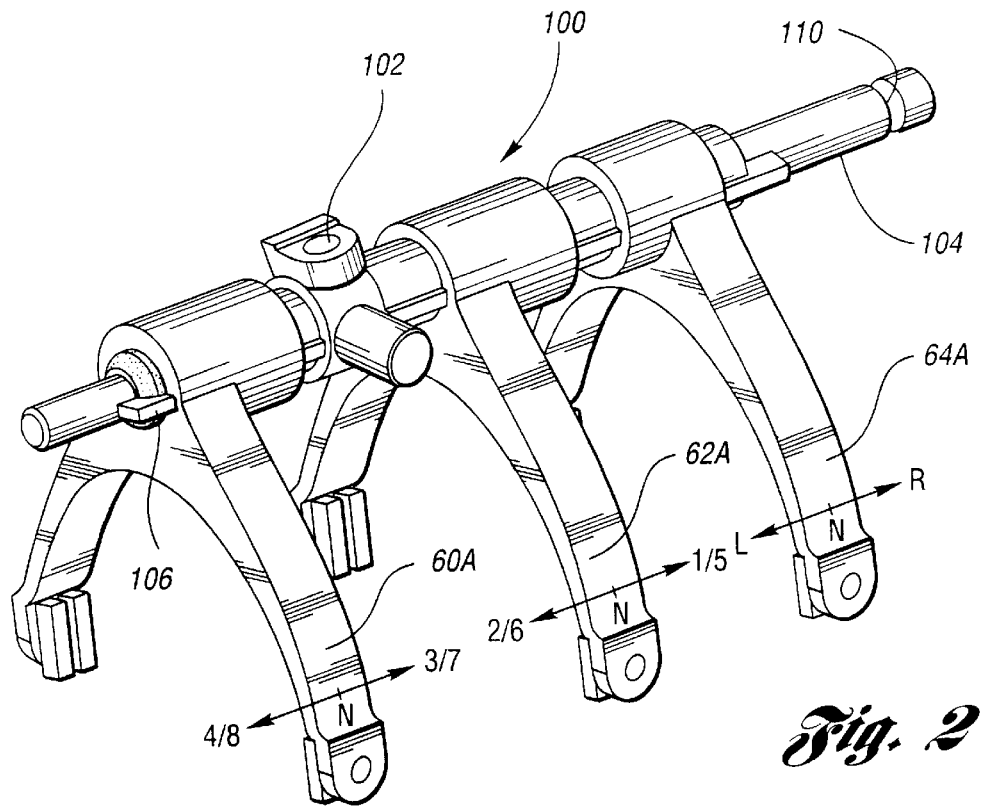
FIG. 2 is a perspective view of a shift fork assembly of the single shift shaft type for use with the main section of the transmission of FIG. 1A.

A single shift shaft type shift fork assembly 100, for use in the main transmission section, is illustrated in FIG. 2. Briefly, shift stick 72 will interact with block member 102 to cause rotational or axial movement of shaft 104 relative to the transmission housing. Rotational movement will cause keys, such as key 106 and another unseen key, to interact with lands or slots provided in the hubs of shift forks 60A, 62A, and 64A to axially fix two of the shift forks relative to the housing and to axially fix the other shift fork to shift shaft 104. Axial movement of shift shaft 104 and the selected shift fork will then result in engagement or disengagement of the associated clutch. Accordingly, by monitoring of the axial position of a selected segment of shift shaft 104, such as one or more neutral detent notches 110, the in-neutral/not-in-neutral condition of the main section 12 of transmission 10 may be sensed. As illustrated, shift forks 60A, 62A and 64A are engagable to put the transmission in gears 4/8 or 3/7, 2/6 or 1/5, and L or R, respectively. Further, each shift fork 60A, 62A, 64A has a centered, neutral position N.

Figure 3A:
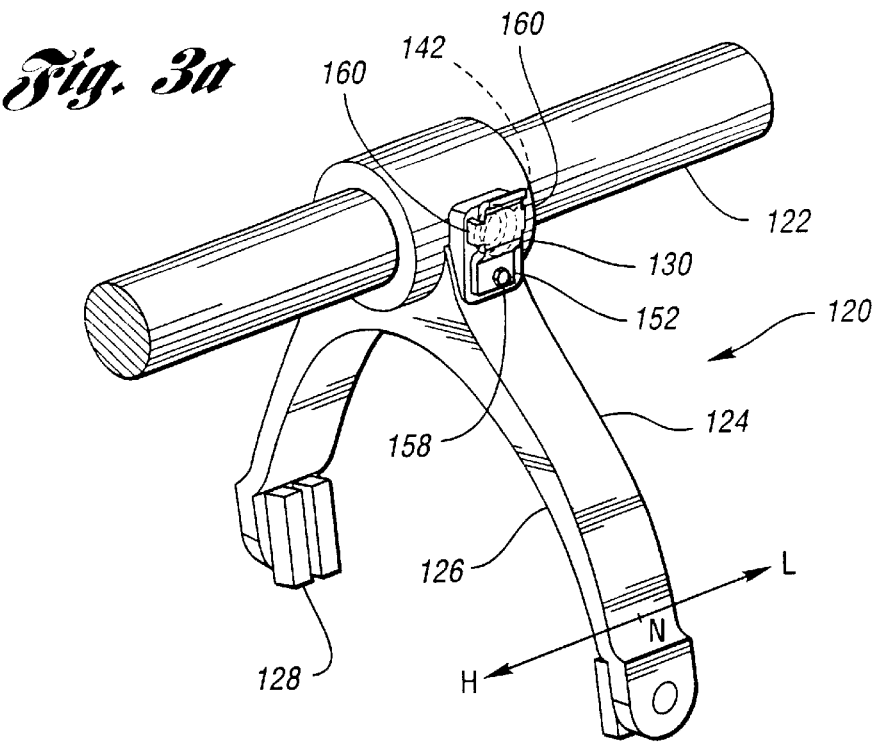
FIG. 3A is a first embodiment of a shift fork assembly of the present invention for use with the auxiliary section of the transmission of FIG. 1A.
Figure 3B:
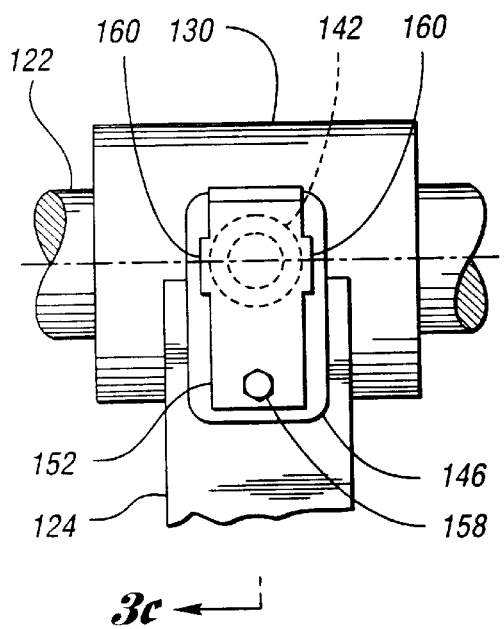
FIG. 3B is a side view of the shift fork assembly of FIG. 3A.
Figure 3C:
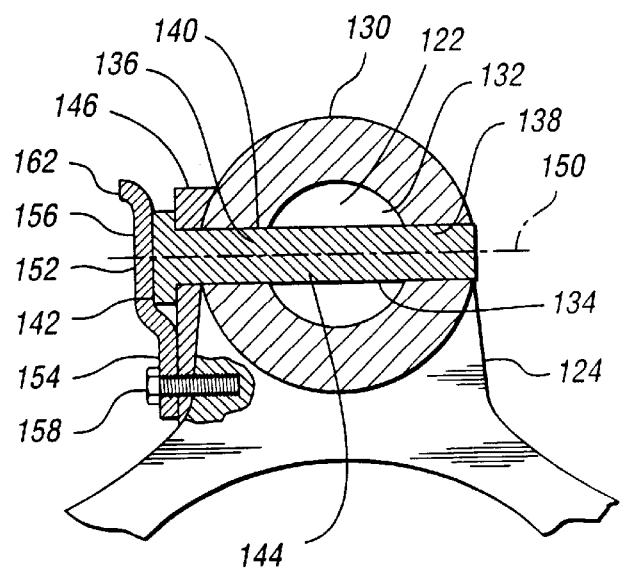
FIG. 3C is a cross-sectional view taken along line 3C—3C of FIG. 3B.

A first embodiment of a shift rail type shift fork assembly 120 for use with the auxiliary transmission section, is illustrated in FIGS. 3A–3C. Shift fork assembly 120 includes a shift rail 122 and a shift fork 124. The shift fork 124 has a pair of arms 126. Although shift fork 124 is shown as symmetrical, it need not be. Low friction material 128 is located at the end of arm 126 for engaging the associated clutch collar. Further, shift fork 124 has a body 130 with an axial bore 132 receiving the shift rail 122 therethrough. This shift rail 122 has a transverse bore 134 that must extend at least partially into the shift rail, and as depicted, extends completely through the shift rail 122. The shift fork 124 has a transverse mount hole 136 intersecting the axial bore 132.

As best shown in FIG. 3C, preferably, first and second opposing mount holes 136 and 138, respectively, are formed in the body 130 of the shift fork 124. A pin 140 has a head 142 and a body 144. The Pin 140 extends through the mount holes 136 and 138 and through the transverse bore 134. Pin 140 is sized for clearance relative to mount holes 136 and 138, and transverse bore 134 to facilitate assembly of shift fork 124 to the shift rail 122.

Alternatively, pin 140 only needs to extend at least partially into transverse bore 134. Further, in such a case, only one mount hole is needed.

Preferably, a boss 146 provides a seat for the head 142 of pin 140. The pin 140 extends along transverse axis 150, passing through first mount hole 136, transverse bore 134, and second mount hole 138, all aligned along transverse axis 150.

A retainer clip 152 is affixed to shift fork 124 and engages pin 140, at pin head 142, to retain pin 140 within the transverse bore 134. As shown, the retainer clip first end 154 is pivotally attached to shift fork 124 at a location spaced from first mount hole 136. The retainer clip second end 156 is pivotable toward and away from first mount hole 136. Pivoting retainer clip 152 away from first mount hole 136 allows pin 140 to be inserted through first mount hole 136, into transverse bore 134. Thereafter, retainer clip 152 may be pivoted to position retainer clip second end 156 into engagement with pin 140 to retain pin 140 within transverse bore 134. A screw 158 pivotally attaches retainer clip first end 154 to boss 146.

Preferably, retainer clip 152 is made of a resilient material. Opposed flanges 160 on retainer clip 152 are positioned on opposite sides of pin head 142 to secure to pin 140. As such, retainer clip 152 retains pin 140 within transverse bore 134, while pin head 142 prevents retainer clip 152 from rotating relative to shift fork 124. During assembly, an assembler pivots retainer clip 152 away from transverse axis 150, allowing pin 140 to be inserted Subsequently, the resiliency of retainer clip 152 allows the assembler to move the retainer clip 152 such that the opposed flanges 160 are positioned on opposite sides of the pin head 142. The second end 156 of the retainer clip 152 has a flange 162 to assist the assembler.

It is to be appreciated that for embodiments of the present invention in which pin head 142 protrudes from mount hole 136, there are a variety of ways to configure retainer clip second end 156 with respect to pin head 142 to prevent rotation of retainer clip 152 with respect to shift fork 124. Thus, the opposed flanges 160 are a preferred configuration of the first embodiment of the present invention; but other configurations are contemplated.

Figure 4A:
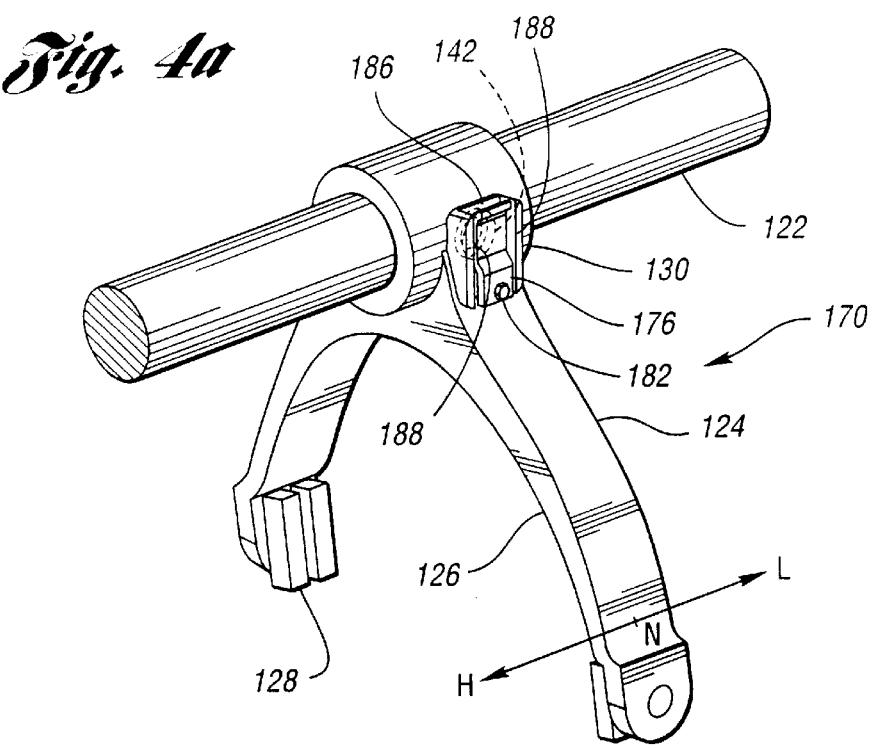
FIG. 4A is a second embodiment of a shift fork assembly of the present invention for use with the auxiliary section of the transmission of FIG. 1A.
Figure 4B:
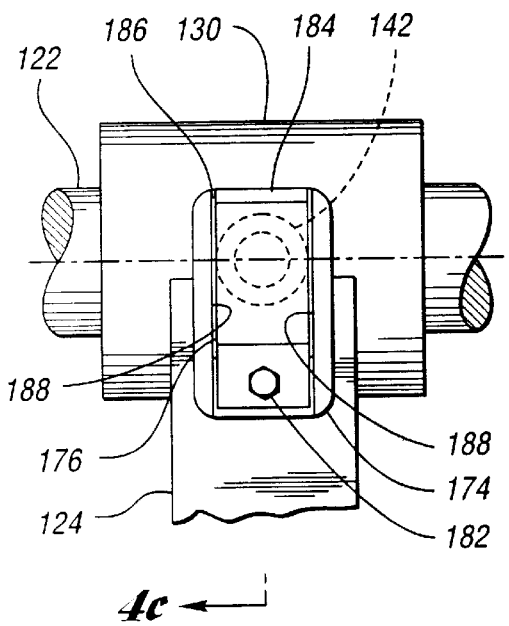
FIG. 4B is a side view of the shift fork assembly of FIG. 4A.
Figure 4C:
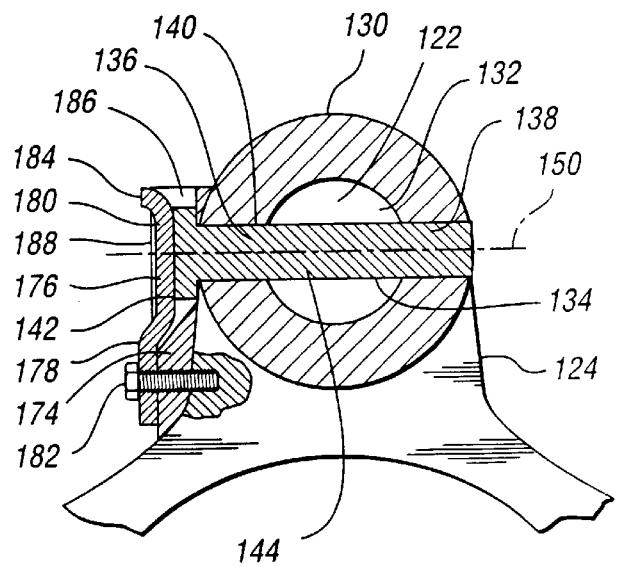
FIG. 4C is a cross-sectional view taken along line 4C—4C of FIG. 4B.

With reference to FIGS. 4A–4C, a second embodiment of a shift rail type shift fork assembly, for use with the auxiliary transmission section, is generally indicated at 170. Like reference numerals have been used to indicate like parts of shift fork assembly 170 and shift fork assembly 120 (FIGS. 3A–3C) The second embodiment of the invention has a boss 174 formed on shift fork 124. A retainer clip 176 has a first end 178 pivotally attached to shift fork 124. Second end 180 of retainer clip 176 retains pin 140. A screw 182 pivotally attaches first end 178 of retainer clip 176 to shift fork 124. A flange 184 is preferably provided to assist the assembler.

As best shown in FIGS. 4B–4C, a groove 186 is formed in boss 174. The first mount hole 136 is formed in a face of groove 186. The retainer clip second end 180 is positioned in groove 186 to engage pin 140 such that groove 186 prevents rotation of retainer clip 176 with respect to shift fork 124. Preferably, retainer clip 176 is also made of a resilient material to assist the assembler. As shown, groove 186 defines side walls 188 which maintain retainer clip 176 in engagement with pin head 142.

Pivoting the retainer clip allows pin 140 to be inserted through first mount hole 136. Thereafter, retainer clip 176 may be positioned in groove 186, and retained by side walls 188, while retainer clip 176 retains pin 140.

It is to be appreciated that the first and second embodiments of the present invention shown in FIGS. 3A–3C and FIGS. 4A–4C, respectively, illustrate two preferred configurations for the retainer clip and pin arrangement. Alternative configurations are contemplated. Further, embodiments of the present invention may be used in compound or non-compound transmissions (or transaxles), and main or auxiliary sections of a compound transmission (or transaxle).

That is, embodiments of the present invention may be employed in any shift rail assembly of the type in which a shift fork is fixed to a shift rail.

Figure 5:
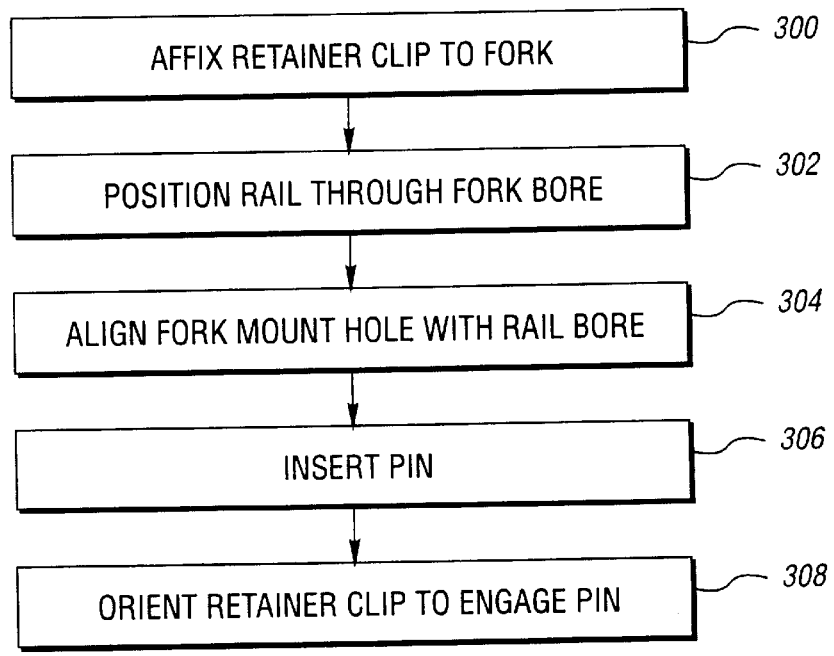
FIG. 5 is a block diagram illustrating a method of the present invention for assembling a transmnission or transaxle.

With reference to FIG. 5, a method of the present invention for assembling a shift fork assembly is illustrated. During assembly of a transmission or transaxle, the retainer clip is affixed to a shift fork, at block 300, preferably before the shift fork is positioned within the transmission or transaxle housing. At block 302, the shift rail is positioned through the axial bore of the shift fork. The shift rail and unfixed shift fork are positioned within the transmission or transaxle housing.

Once the shift fork and shift rail are positioned within the housing, while the shift fork is not yet fixed to the shift rail, embodiments of the present invention advantageously provide for easier assembly. At block 304, the shift fork mount hole is aligned with the shift rail transverse bore. of course, the shift fork may have a pair of opposed mount holes, or a single mount hole on one side of the shift fork. Further, if there is only one mount hole in the shift fork, the shift rail transverse bore need not extend therethrough.

At block 306, the pin is inserted through the mount hole of the shift fork and at least partially into the transverse bore of the shift rail. To facilitate assembly of the shift fork to the shift rail, the pin is preferably sized for clearance relative to the shift fork mount hole and the shift rail transverse bore. At block 308, the assembler orients the retainer clip to engage the pin, completing the shift fork assembly. The retainer clip and pin arrangement may take many forms, for example, first and second preferred embodiments of the present invention as illustrated in FIGS. 3A–3C and FIGS. 4A–4C, respectively.

While the best mode for carrying out the invention has been described in detail, those familiar with the art to which this invention relates will recognize various alternative designs and embodiments for practicing the invention as defined by the following claims.

What is claimed is:

1. A shift fork assembly comprising:
   a shift rail having a transverse bore extending at least partially into the shift rail;
   a shift fork having an axial bore receiving the shift rail therethrough, and a transverse mount hole intersecting the axial bore;
   a pin extending through the mount hole and at least partially into the transverse bore, the pin being sized for clearance relative to the mount hole and the transverse bore to facilitate assembly of the shift fork to the shift rail; and
   a retainer clip affixed to the shift fork and engaging the pin to retain the pin within the transverse bore.

2. The assembly of claim 1 wherein the transverse bore extends completely through the shift rail, and wherein the shift fork mount hole comprises:
   a first mount hole along a transverse axis and intersecting the axial bore; and
   a second mount hole along the transverse axis and opposite the first mount hole, the second mount hole intersecting the axial bore,
   wherein the pin extends along the transverse axis through the first mount hole, the transverse bore, and the second mount hole.

3. The assembly of claim 1 wherein the retainer clip further comprises:
   a first end pivotally attached to the shift fork at a location spaced from the mount hole; and
   a second end pivotable toward and away from the mount hole so that the pin may be inserted through the mount hole, and so that the second end may be subsequently positioned into engagement with the pin to retain the pin within the transverse bore.

4. The assembly of claim 3 wherein the pin further comprises:
   a head protruding from the mount hole when the pin is received through the mount hole,
   wherein the retainer clip second end is configured with respect to the pin head to prevent rotation of the retainer clip with respect to the shift fork when the retainer clip second end and pin head are engaged.

5. The assembly of claim 4 wherein the retainer clip second end includes a pair of opposed flanges for engaging opposite sides of the pin head.

6. The assembly of claim 3 wherein the shift fork has a groove formed therein and the mount hole is formed in a face of the groove, and wherein the retainer clip second end is positioned in the groove to engage the pin such that the groove prevents rotation of the retainer clip with respect to the shift fork.

7. The assembly of claim 3 wherein the retainer clip is made of a resilient material.

8. A shift fork assembly comprising:
   a shift fork having an axial bore for receiving a shift rail therethrough, and a transverse mount hole intersecting the axial bore; and
   a retainer clip affixed to the shift fork for retaining a pin that extends through the mount hole and at least partially into a transverse bore in the shift rail to assemble the shift fork to the shift rail.

9. The assembly of claim 8 wherein the shift fork mount hole comprises:
   a first mount hole along a transverse axis and intersecting the axial bore; and
   a second mount hole along the transverse axis and opposite the first mount hole, the second mount hole intersecting the axial bore.

10. The assembly of claim 8 wherein the retainer clip further comprises:
    a first end pivotally attached to the shift fork at a location spaced from the mount hole; and
    a second end pivotable toward and away from the mount hole so that the pin may be inserted through the mount hole, and so that the second end may be subsequently positioned into engagement with the pin to retain the pin within the transverse bore.

11. The assembly of claim 10 wherein the retainer clip second end includes a pair of opposed flanges for engaging opposite sides of the pin.

12. The assembly of claim 10 wherein the shift fork has a groove formed therein and the mount hole is formed in a face of the groove, and wherein the retainer clip second end is positioned in the groove to engage the pin such that the groove prevents rotation of the retainer clip with respect to the shift fork.

13. The assembly of claim 10 wherein the retainer clip is made of a resilient material.

14. A method of assembling a shift fork assembly, the method comprising:

affixing a retainer clip to a shift fork having an axial bore and a transverse mount hole intersecting the axial bore;

positioning a shift rail through the axial bore of the shift fork, the shift rail having a transverse bore extending at least partially into the shift rail;

aligning the shift fork mount hole with the shift rail transverse bore;

inserting a pin through the mount hole at least partially into the transverse bore, the pin being sized for clearance relative to the mount hole and transverse bore to facilitate assembly of the shift fork to the shift rail; and orienting the retainer clip to engage the pin and retain the pin within the transverse bore.

\* \* \* \* \*